United States Patent
Kozuka et al.

(10) Patent No.: US 11,283,086 B2
(45) Date of Patent: Mar. 22, 2022

(54) FUEL CELL SYSTEM

(71) Applicant: TOYOTA JIDOSHA KABUSHIKI KAISHA, Toyota (JP)

(72) Inventors: Tomoyuki Kozuka, Nagoya (JP); Tateki Takayama, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 118 days.

(21) Appl. No.: 16/878,703

(22) Filed: May 20, 2020

(65) Prior Publication Data

US 2020/0388859 A1    Dec. 10, 2020

(30) Foreign Application Priority Data

Jun. 6, 2019    (JP) .............................. JP2019-105863

(51) Int. Cl.
| | |
|---|---|
| *H01M 8/0252* | (2016.01) |
| *B60L 50/72* | (2019.01) |
| *H01M 8/04082* | (2016.01) |

(52) U.S. Cl.
CPC .......... *H01M 8/0252* (2013.01); *B60L 50/72* (2019.02); *H01M 8/04201* (2013.01); *H01M 2250/20* (2013.01)

(58) Field of Classification Search
CPC ........................ H01M 8/0252; H01M 8/04201
USPC ....................................................... 429/444
See application file for complete search history.

(56) References Cited

U.S. PATENT DOCUMENTS

| | | | |
|---|---|---|---|
| 1,681,796 A | 8/1928 | Wendell | |
| 2009/0162730 A1* | 6/2009 | Ohira | H01M 8/04164 429/410 |
| 2016/0141652 A1* | 5/2016 | Itoga | H01M 8/04253 429/415 |
| 2019/0013531 A1 | 1/2019 | Kozuka | |
| 2019/0123365 A1 | 4/2019 | Kamiyama | |

FOREIGN PATENT DOCUMENTS

| | | | | |
|---|---|---|---|---|
| DE | 112010005734 T5 * | 7/2013 | ........ | H01M 8/04223 |
| DE | 102018114079 A1 | 1/2019 | | |
| DE | 102018120601 A1 | 4/2019 | | |
| JP | 2019016495 A | 1/2019 | | |
| WO | WO-2009060772 A1 * | 5/2009 | ........ | H01M 8/04164 |

* cited by examiner

*Primary Examiner* — James M Erwin
(74) *Attorney, Agent, or Firm* — Dickinson Wright, PLLC

(57) ABSTRACT

A fuel cell system includes a gas-liquid separator and a fuel gas pump configured to return the fuel off-gas in the gas-liquid separator to the fuel cell stack. The gas-liquid separator has a first connecting portion extending upward. The fuel gas pump has an inner wall surface constituting a pump chamber, and a lower part of the inner wall surface is provided with an opening into which the first connecting portion is inserted. The lower part of the inner wall surface is inclined downward toward the opening. A tip end of the first connecting portion is disposed at a height equal to or lower than a height of an extension plane extending along the lower part of the inner wall surface. The tip end of the first connecting portion is provided with an inclined surface inclined downward toward the inner peripheral surface.

3 Claims, 6 Drawing Sheets

FUEL CELL SYSTEM

INCORPORATION BY REFERENCE

The disclosure of Japanese Patent Application No. 2019-105863 filed on Jun. 6, 2019 including the specification, drawings and abstract is incorporated herein by reference in its entirety.

BACKGROUND

1. Technical Field

The disclosure relates to a fuel cell system including a gas-liquid separator and a fuel gas pump.

2. Description of Related Art

There is a known fuel cell system including a gas-liquid separator and a hydrogen gas pump (fuel gas pump) (see Japanese Unexamined Patent Application Publication No. 2019-16495 (JP 2019-16495 A), for example). The gas-liquid separator separates water contained in hydrogen off-gas (fuel off-gas) from the hydrogen off-gas discharged from the fuel cell stack and stores and discharges the separated water. The hydrogen gas pump (fuel gas pump) causes the hydrogen off-gas in the gas-liquid separator to return to a fuel cell stack.

In the above JP 2019-16495 A, the hydrogen gas pump is arranged on an upper surface of the gas-liquid separator. The hydrogen off-gas is sucked through an opening provided in a lower part of the hydrogen gas pump, and delivered to the fuel cell stack from a delivery port provided in an upper part of the hydrogen gas pump.

SUMMARY

The hydrogen off-gas that has flowed into the hydrogen gas pump from the gas-liquid separator contains water, and if the water remains in the hydrogen gas pump, the water may freeze while a vehicle is not moving. Specifically, if water accumulates at a connecting portion between the hydrogen gas pump and the gas-liquid separator, the accumulated water may freeze and block the connecting portion, or water drops in the gas-liquid separator due to vibration or the like after the vehicle stops and the dropped water may freeze and block a discharge path of the gas-liquid separator.

The disclosure provides a fuel cell system that can restrain liquid from remaining in a fuel gas pump.

An aspect of the disclosure relates to a fuel cell system. The fuel cell system includes: a gas-liquid separator and a fuel gas pump. The gas-liquid separator is configured to separate, from fuel off-gas, liquid contained in the fuel off-gas discharged from a fuel cell stack and store and discharge the separated liquid. The fuel gas pump is connected to the gas-liquid separator and is configured to return the fuel off-gas in the gas-liquid separator to the fuel cell stack. The gas-liquid separator has a first connecting portion having a tubular shape and extending upward. The fuel gas pump has an inner wall surface constituting a pump chamber, and a lower part of the inner wall surface is provided with an opening that is configured such that the first connecting portion is inserted into the opening. The lower part of the inner wall surface is inclined downward toward the opening. A tip end of the first connecting portion is disposed at a height equal to or lower than a height of an extension plane extending along the lower part of the inner wall surface. The tip end of the first connecting portion is provided with an inclined surface that is continuous with an inner peripheral surface of the first connecting portion and is inclined downward toward the inner peripheral surface.

In the present specification and claims, the term "inclination angle" refers to an inclination angle with respect to a horizontal plane.

In the fuel cell system according to the disclosure, the flow of the fuel off-gas around the tip end of the first connecting portion can be made smooth. That is, it is possible to suppress stagnation of the fuel off-gas around the opening of the fuel gas pump. Thus, liquid in the fuel gas pump can be efficiently delivered to the fuel cell stack together with the fuel off-gas, so that it is possible to suppress the water from remaining in the fuel gas pump.

In addition, the tip end of the first connecting portion is provided with the inclined surface that is continuous with the inner peripheral surface of the first connecting portion and is inclined downward toward the inner peripheral surface. This facilitates the liquid adhering to the tip end (inclined surface) of the first connecting portion to return to the gas-liquid separator. That is, it is possible to suppress accumulation of liquid attached to the opening of the fuel gas pump. Accordingly, it is possible to restrain the liquid accumulated in the opening of the fuel gas pump from freezing to block the opening. Also, it is possible to restrain the liquid accumulated in the opening of the fuel gas tank from falling into the gas-liquid separator due to vibration or the like after the vehicle stops and freezing to block the discharge path of the gas-liquid separator.

In the fuel cell system of the above aspect, the inclined surface of the first connecting portion may be disposed on the extension plane. With this configuration, the flow of the fuel off-gas can be made smooth, in particular, around the lower part of the inner wall surface and the inclined surface. That is, it is possible to suppress, in particular, stagnation of the fuel off-gas around the opening of the fuel gas pump. Thus, the liquid in the fuel gas pump can be efficiently delivered to the fuel cell stack together with the fuel off-gas, so that it is possible to suppress, in particular, the liquid from remaining in the fuel gas pump.

The fuel cell system of the above aspect may further include an introduction pipe configured to introduce the fuel off-gas discharged from the fuel cell stack into the gas-liquid separator. The gas-liquid separator may have a second connecting portion having a tubular shape and configured such that the introduction pipe is inserted into the second connecting portion and connected to the second connecting portion. At least a lowermost part of an inner peripheral surface of the second connecting portion in a circumferential direction may be provided so as to extend in a uniform manner downward toward a downstream side, in a region further downstream from a downstream end of the introduction pipe. With this configuration, liquid droplets attached to the lowermost part of the inner peripheral surface of the second connecting portion in the circumferential direction move downstream of the second connecting portion and fall into the reservoir. That is, unlike the case where, for example, a step projecting upward toward the downstream side is formed in the lowermost part of the inner peripheral surface of the second connecting portion in the circumferential direction, it is possible to suppress accumulation of liquid in the second connecting portion of the gas-liquid separator. Accordingly, it is possible to restrain the liquid accumulated in the second connecting portion of the gas-liquid separator from freezing to block the second connecting portion. Also, it is possible to restrain the liquid accumulated in the second connecting portion of the gas-liquid separator from falling into the gas-liquid separator due to vibration or the like after the vehicle stops and freezing to block the discharge passage of the gas-liquid separator.

According to the disclosure, it is possible to provide a fuel cell system that can restrain liquid from remaining in the fuel gas pump.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
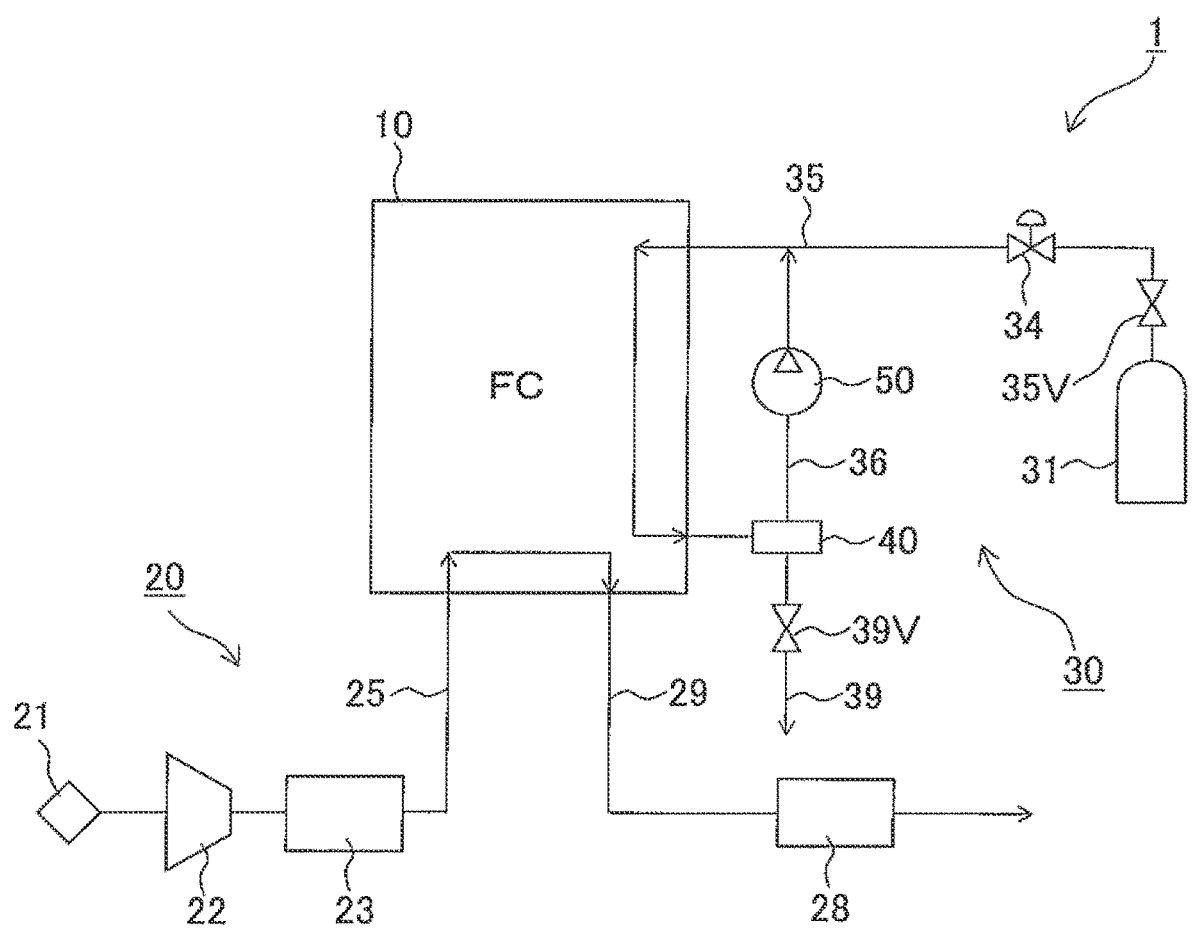
FIG. 1 is a system configuration diagram of a fuel cell system according to an embodiment of the disclosure.

Hereinafter, a configuration of the disclosure will be described in detail based on an example of an embodiment shown in the drawings. Hereinafter, as an example, a case where the disclosure is applied to a fuel cell mounted on a fuel cell vehicle or a fuel cell system including the fuel cell will be described. However, the application range is not limited to the example.

A fuel cell system 1 is mounted on a vehicle (not shown) and supplies electric power for driving the vehicle. As shown in FIG. 1, the fuel cell system 1 includes a fuel cell stack 10, an oxidant gas supply system 20, and s fuel gas supply system 30. The fuel cell stack 10 is formed by stacking a plurality of fuel cells serving as unit cells. The oxidant gas supply system 20 supplies oxidant gas such as air to the fuel cell stack 10. The fuel gas supply system 30 supplies fuel gas such as hydrogen to the fuel cell stack 10.

The oxidant gas supply system 20 includes, for example, an oxidant gas supply passage 25 and an oxidant gas discharge passage 29. The oxidant gas supply passage 25 is used for supplying oxidant gas to (a cathode electrode of) the fuel cell stack 10. The oxidant gas discharge passage 29 is used for discharging, from the fuel cell stack 10, oxidant off-gas generated by subjecting oxidant gas supplied to the fuel cell stack 10 to the electrochemical reaction. Each passage of the oxidant gas supply system 20 can be composed of a pipe such as a rubber hose or a metal pipe.

The oxidant gas supply passage 25 is provided with an air cleaner 21, a compressor 22, an intercooler 23 and the like from an upstream side, and the oxidant gas discharge passage 29 is provided with a muffler 28 and the like.

In the oxidant gas supply passage 25, the air cleaner 21 removes dust in the oxidant gas (air, etc.) taken in from the atmosphere. The compressor 22 compresses the oxidant gas introduced through the air cleaner 21, and supplies the compressed oxidant gas to the intercooler 23. The intercooler 23 cools, by heat exchange with a refrigerant, for example, the introduced oxidant gas supplied from the compressor 22 while the oxidant gas is passing through the intercooler 23, and supplies the cooled oxidant gas to (the cathode electrode of) the fuel cell stack 10.

In the oxidant gas discharge passage 29, the muffler 28 separates the oxidant off-gas (exhaust gas) flowing through the oxidant gas discharge passage 29 into a gas phase and a liquid phase, for example, and discharges them to the outside.

The fuel gas supply system 30 includes, for example, a fuel gas supply source 31, a fuel gas supply passage 35, a return passage 36, and a fuel gas discharge passage 39. The fuel gas supply source 31 includes a hydrogen tank etc. for storing high-pressure fuel gas such as hydrogen. The fuel gas supply passage 35 supplies the fuel gas from the fuel gas supply source 31 to (the anode electrode of) the fuel cell stack 10. The return passage 36 returns a portion of the fuel off-gas discharged from the fuel cell stack 10 to the fuel gas supply passage 35. The fuel gas discharge passage 39 is branched off from the return passage 36 and discharges the fuel off-gas in the return passage 36 to the outside (to the atmosphere). Each passage of the fuel gas supply system 30 can be composed of a pipe such as a rubber hose or a metal pipe.

The fuel gas supply passage 35 is provided with a shutoff valve 35V and a regulator 34. The shutoff valve 35V is used for opening and closing the fuel gas supply passage 35 to shut off the fuel gas flowing toward the fuel cell stack 10. The regulator 34 is used for adjusting (reducing) the pressure of the fuel gas flowing through the fuel gas supply passage 35. When the shutoff valve 35V is opened, high-pressure fuel gas stored in the fuel gas supply source 31 flows out of the fuel gas supply source 31 to the fuel gas supply passage 35, and the pressure of the fuel gas is regulated (reduced) by the regulator 34. Then, the fuel gas is supplied to (the anode electrode of) the fuel cell stack 10.

The return passage 36 is provided with a gas-liquid separator 40, a fuel gas pump (also referred to as a hydrogen pump) 50, and the like from the upstream side (the fuel cell stack 10 side). The gas-liquid separator 40 separates generated water from the fuel gas (such as hydrogen) flowing through the return passage 36 and stores the generated water. The fuel gas discharge passage 39 branches off from the gas-liquid separator 40. The fuel gas pump 50 sends out a portion of fuel off-gas separated from the generated water by the gas-liquid separator 40 to return the portion to the fuel gas supply passage 35.

The fuel gas discharge passage 39 is provided with a drain valve 39V for opening and closing the fuel gas discharge passage 39 to discharge the generated water separated by the gas-liquid separator 40 and a portion of the fuel off-gas discharged from the fuel cell stack 10.

The fuel cell system having the above configuration, electric power is generated by electrochemical reaction between oxidant gas such as air supplied to (the cathode electrode of) the fuel cell stack 10 through the oxidant gas supply system 20 and fuel gas such as hydrogen supplied to (the anode electrode of) the fuel cell stack 10 through the fuel gas supply system 30.

Next, structures of the gas-liquid separator 40 and the fuel gas pump 50 of the fuel cell system 1 according to the present embodiment will be described in detail. The gas-liquid separator 40 separates liquid such as water contained in the fuel off-gas discharged from the fuel cell stack 10, and stores and discharges the separated liquid.

Figure 2:
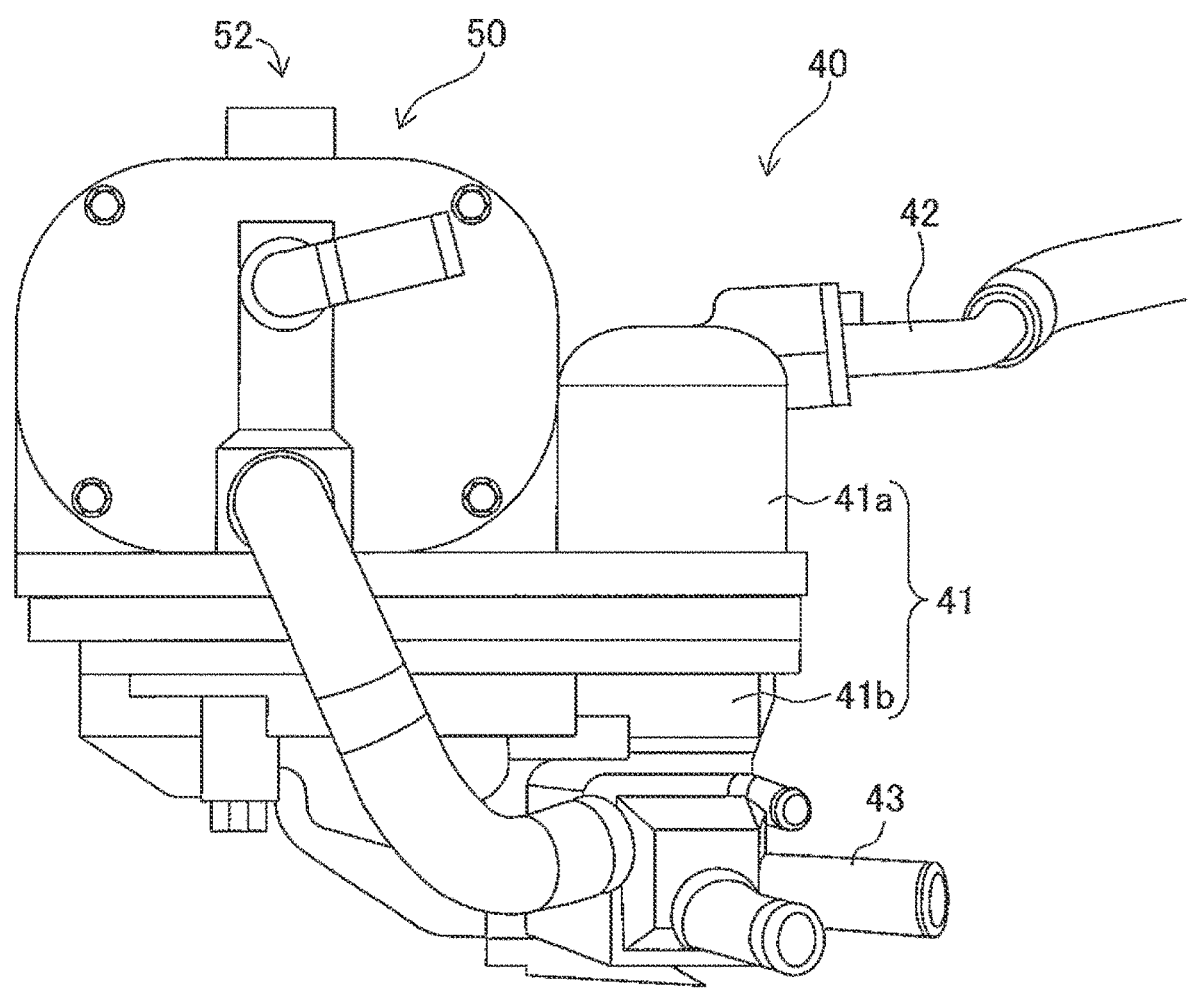
FIG. 2 is a side view showing a structure around a gas-liquid separator and a fuel gas pump of the fuel cell system according to the embodiment of the disclosure.
Figure 3:
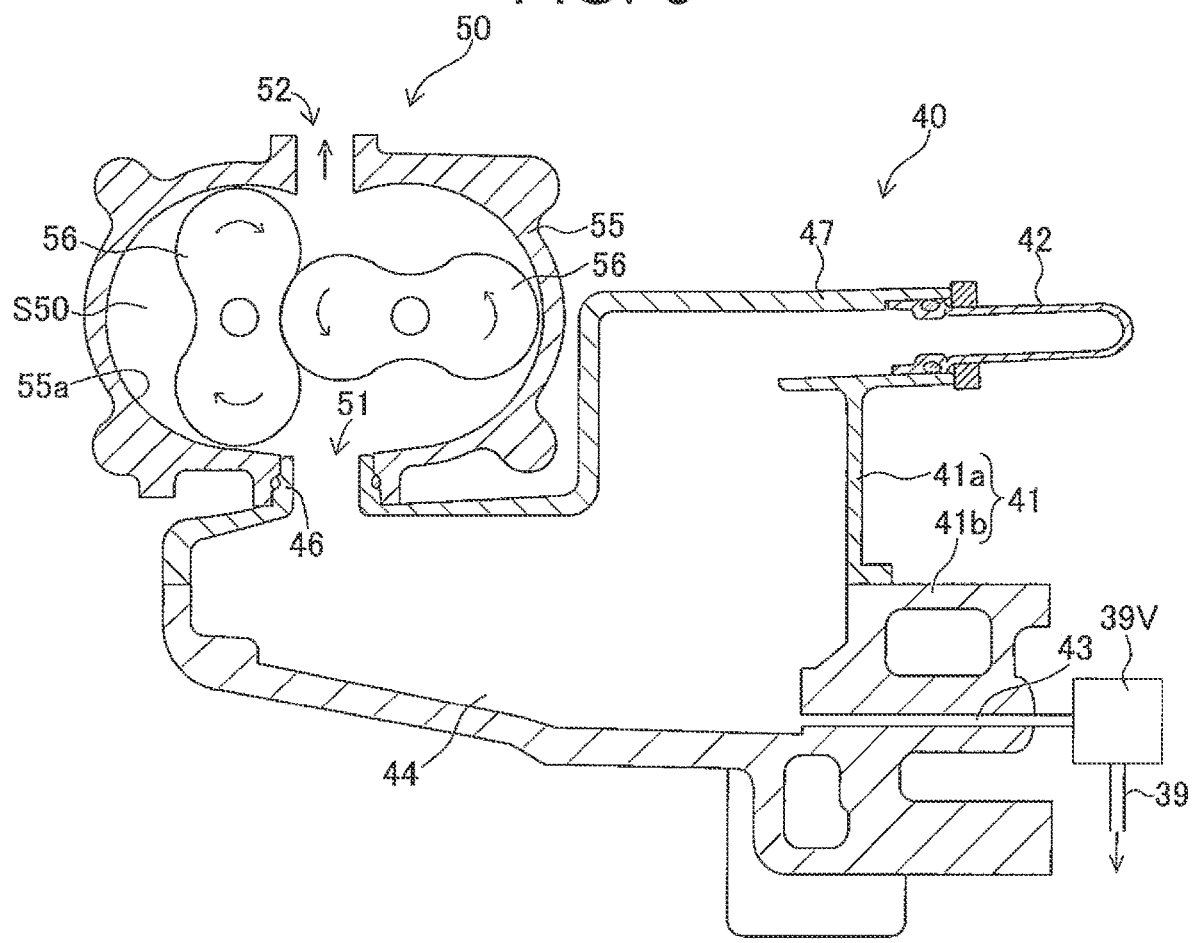
FIG. 3 is a sectional view showing a structure around the gas-liquid separator and the fuel gas pump of the fuel cell system according to the embodiment of the disclosure.

As shown in FIGS. 2 and 3, the gas-liquid separator 40 includes a case 41 composed of an upper case 41a and a lower case 41b, and is sealed with an O-ring (not shown) or the like. An upper right part of the upper case 41a in FIG. 3 is provided with an introduction pipe 42. The introduction pipe 42 communicates with an opening (not shown) of the fuel cell stack 10, through which fuel off-gas in the fuel cell stack 10 is discharged, and constitutes a part of the return passage 36. The introduction pipe 42 is configured to introduce into the case 41 the fuel off-gas after power generation by the fuel cell stack 10. The introduction pipe 42 is inclined downward from the fuel cell stack 10 toward the gas-liquid separator 40 and is connected to the gas-liquid separator 40. The detailed structure of a connection part between the gas-liquid separator 40 and the introduction pipe 42 will be described later.

As shown in FIG. 3, a tubular first connecting portion 46 is provided at a predetermined position on an upper surface of the upper case 41a so as to extend upward (in a direction opposite to the direction of gravity). The first connecting portion 46 is inserted into an opening 51 of the fuel gas pump 50. The fuel off-gas separated from the liquid by the gas-liquid separator 40 is sucked up by the fuel gas pump 50, and then flows to the fuel gas supply passage 35 via a delivery port 52 provided in an upper surface of the fuel gas pump 50. The detailed structure around the first connecting portion 46 between the fuel gas pump 50 and the gas-liquid separator 40 will be described later.

The gas-liquid separator 40 is provided with a discharge path 43 for discharging the separated liquid such as water below a discharge port of the introduction pipe 42, and a reservoir 44 for storing the separated liquid upstream of the discharge path 43.

Specifically, the lower case 41b has a tapered shape gradually tapering downward, and the reservoir 44 is provided in a recess at the bottom of the lower case 41b. The discharge path 43 is a through-hole provided at a position slightly higher than a bottom surface of the reservoir 44 and passing through in a substantially horizontal direction.

The through-hole serving as the discharge path 43 extends to the outside of the case 41 and is connected to the drain valve 39V outside the case 41. The through-hole is connected to the fuel gas discharge passage 39 via the drain valve 39V.

In the fuel cell system 1, the fuel off-gas discharged from the fuel cell stack 10 is introduced into the case 41 of the gas-liquid separator 40 through the introduction pipe 42, and is separated into gas and liquid. The gas separated by the gas-liquid separator 40 is caused to flow to the fuel gas supply passage 35 by the fuel gas pump 50 and is supplied to the fuel cell stack 10 again while the fuel cell system 1 is operating.

On the other hand, the liquid separated by the gas-liquid separator 40 is stored in the reservoir 44 of the lower case 41b with the drain valve 39V closed, while the fuel cell system 1 is operating. When a liquid level sensor (not shown) of the reservoir 44 detects that a predetermined amount of liquid has been stored in the reservoir 44, the drain valve 39V opens and a portion of the stored liquid is discharged to the outside through the discharge path 43.

When the fuel cell system 1 is not operating, the drain valve 39V is opened, and the stored liquid and fuel off-gas are discharged to the outside through the discharge path 43.

Next, the structure around the first connecting portion 46 between the fuel gas pump 50 and the gas-liquid separator 40 will be described in detail. The fuel gas pump 50 includes a case 55 and two rotors 56 rotatably arranged in the case 55. An opening 51 is provided at a center of a lower surface of the case 55, through which the fuel off-gas is introduced. The delivery port 52 is provided at a center of the upper surface of the case 55, through which fuel off-gas is delivered. The fuel off-gas contains water and water vapor. The two rotors 56 rotate to generate an air flow in the case 55, so that the fuel off-gas, water, and water vapor are sucked from the gas-liquid separator 40 and delivered from the delivery port 52. Note that an upper limit is set for a rotation speed of the rotors 56 as noise and vibration control measures. Thus, water may normally remain in the case 55.

Figure 4:
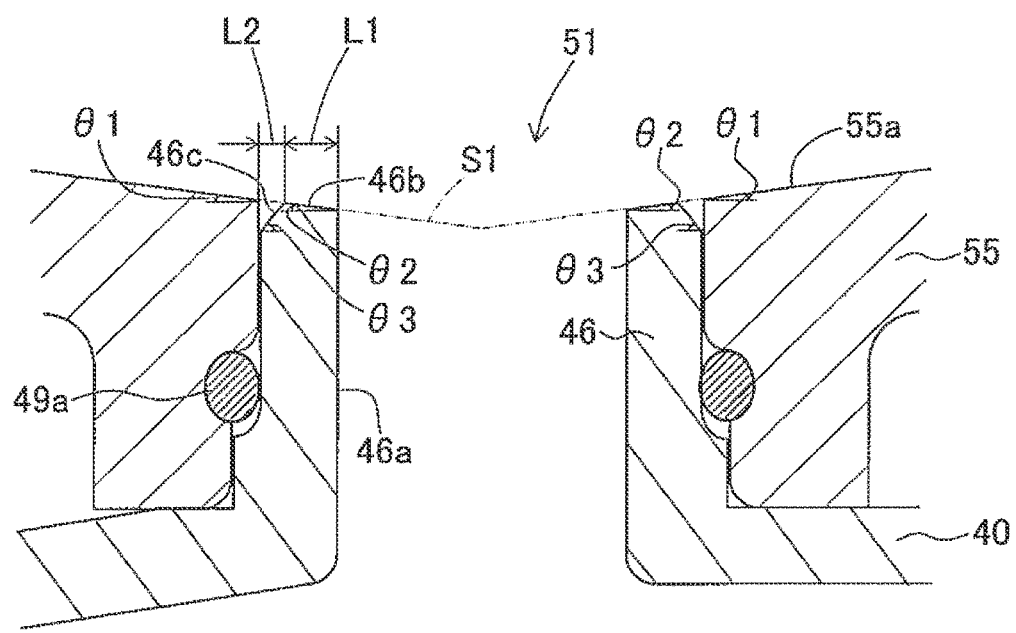
FIG. 4 is a sectional view showing a structure around a first connecting portion of the gas-liquid separator of the fuel cell system according to the embodiment of the disclosure.

The case 55 has an inner wall surface 55a that constitutes a pump chamber S50. As shown in FIG. 4, a lower part of the inner wall surface 55a is formed so as to be inclined downward (in the direction of gravity) toward the opening 51, and the opening 51 is provided at the lowest position of the inner wall surface 55a.

An O-ring 49a is provided on an outer peripheral surface of the first connecting portion 46 of the gas-liquid separator 40 so as to seal between the outer peripheral surface of the first connecting portion 46 and an inner peripheral surface of the opening 51.

Figure 5:
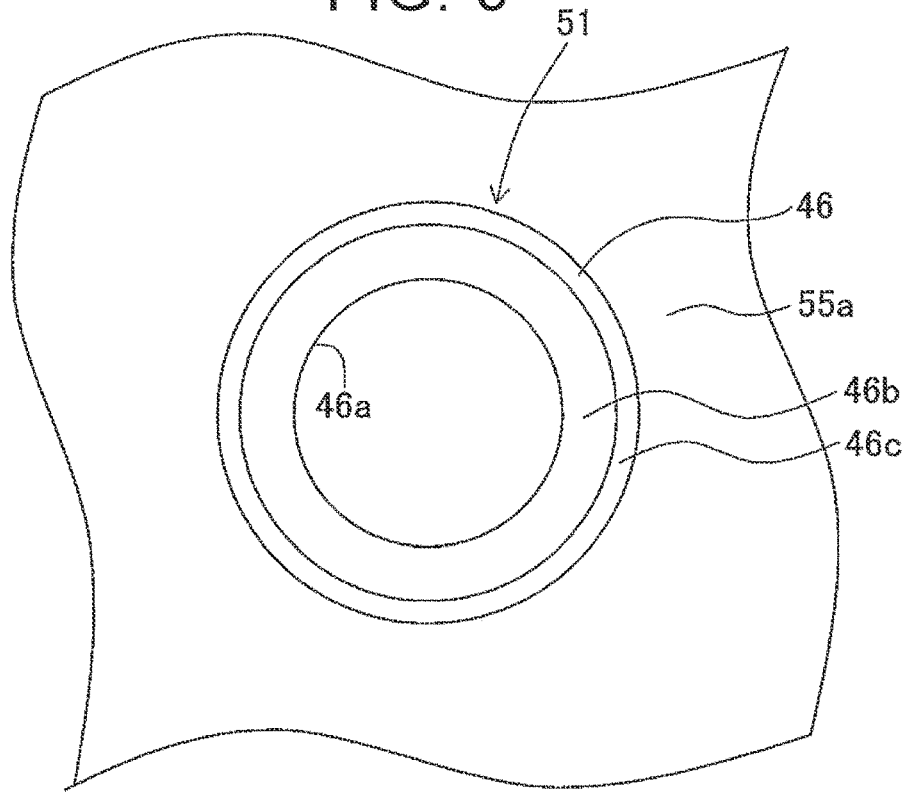
FIG. 5 is a plan view showing a structure around the first connecting portion of the gas-liquid separator of the fuel cell system according to the embodiment of the disclosure.

Here, in the present embodiment, a tip end (upper end) of the first connecting portion 46 is disposed at a height equal to or lower than a height of an extension plane S1 along the lower part of the inner wall surface 55a of the fuel gas pump 50 (plane defined by extending the inclined surface of the lower part). The extension plane S1 is a virtual plane. The tip end of the first connecting portion 46 is provided with an inclined surface 46b. The inclined surface 46b is provided so as to be continuous with an upper end of an inner peripheral surface 46a of the first connecting portion 46 and inclined downward toward the inner peripheral surface 46a. This makes it easy for water droplets attached to the tip end of the first connecting portion 46 to fall in the gas-liquid separator 40. A tapered surface 46c is provided radially outward of an outer edge of the inclined surface 46b so as to be inclined downward in a radially outward direction. The tapered surface 46c is used to facilitate insertion of the first connecting portion 46 into the opening 51 of the fuel gas pump 50. The tip end of the first connecting portion 46 is composed of the inclined surface 46b and the tapered surface 46c. As shown in FIG. 5, the opening 51 and the first connecting portion 46 both have a perfect circular shape as viewed from above.

As shown in FIG. 4, the inclined surface 46b is formed so as to have an inclination angle $\theta 2$ that is equal to or larger than an inclination angle $\theta 1$ of the lower part of the inner wall surface 55a. In the present embodiment, the inclined surface 46b is formed so as to have an inclination angle $\theta 2$ that is equal to the inclination angle $\theta 1$ of the lower part of the inner wall surface 55a. A radial length L1 of the inclined surface 46b is longer than a radial length L2 of the tapered surface 46c. The tapered surface 46c is formed so as to have an inclination angle θ3 that is larger than the inclination angle θ2 of the inclined surface 46b.

The inclined surface 46b is disposed at a height equal to or lower than a height of the extension plane S1 extending along the lower part of the inner wall surface 55a as described above. In the present embodiment, the inclined surface 46b is disposed on the extension plane S1. Thus, the air current generated with the rotation of the rotors 56 flows from the inclined surface 46b to the inner wall surface 55a smoothly without disturbance. Therefore, it is possible to suppress stagnation of the fuel off-gas around the opening 51. Thereby, the fuel off-gas, water, and water vapor introduced through the opening 51 can be efficiently delivered from the delivery port 52, so that accumulation of water in the lower part of the inner wall surface 55a can be suppressed.

Figure 6:
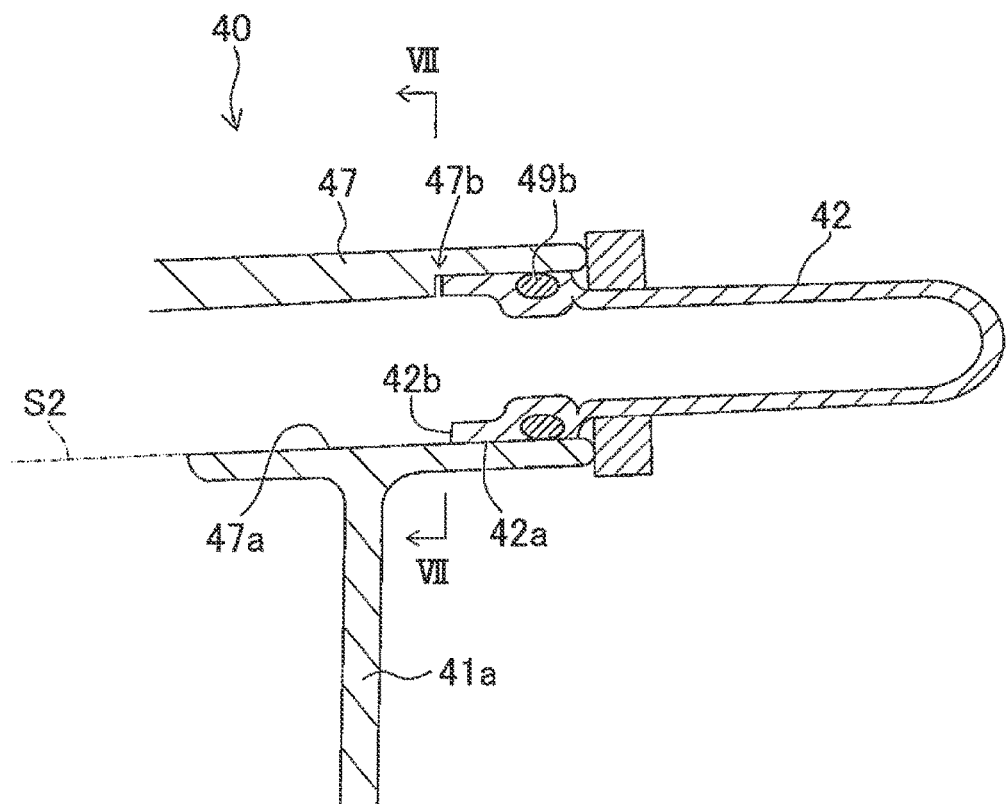
FIG. 6 is a sectional view showing a structure of a connection part between the gas-liquid separator and an introduction pipe in the fuel cell system according to the embodiment of the disclosure.

Next, the structure of the connection part between the gas-liquid separator 40 and the introduction pipe 42 will be described in detail. A tubular second connecting portion 47 is provided at the upper right part of the upper case 41a in FIG. 3, into which the introduction pipe 42 is inserted to be connected. As shown in FIG. 6, the second connecting portion 47 has an inner peripheral surface 47a extending along an outer peripheral surface 42a of a downstream end 42b of the introduction pipe 42 and is slightly inclined downward toward the inside of the case 41.

The downstream end 42b of the introduction pipe 42 is inserted into the second connecting portion 47, and the outer peripheral surface 42a of the introduction pipe 42 is in contact with the inner peripheral surface 47a of the second connecting portion 47. An O-ring 49b is provided on the outer peripheral surface 42a of the introduction pipe 42 so as to seal between the outer peripheral surface 42a of the introduction pipe 42 and the inner peripheral surface 47a of the second connecting portion 47.

Here, at least a lowermost part of the inner peripheral surface 47a of the second connecting portion 47 in a circumferential direction is formed so as to extend in a uniform manner downward toward the downstream side, at least in a region further downstream (on the left side in FIG. 6) from the downstream end 42b of the introduction pipe 42. In the present embodiment, at least the lowermost part of the inner peripheral surface 47a of the second connecting portion 47 in the circumferential direction is formed so as to extend in a uniform manner downward toward the downstream side over the entire length thereof. That is, at least the lowermost part of the inner peripheral surface 47a of the second connecting portion 47 in the circumferential direction is formed in a linear shape without steps so as to extend along an extension plane S2 of the outer peripheral surface 42a of the introduction pipe 42. The extension plane S2 is a virtual plane. As a result, at least the lowermost part of the inner peripheral surface 47a of the second connecting portion 47 in the circumferential direction has no portion in which the liquid droplets accumulate (recess or upward step). Thus, water droplets attached to the lowermost part of the inner peripheral surface 47a of the second connecting portion 47 in the circumferential direction due to water or water vapor contained in the fuel off-gas move toward the downstream side of the second connecting portion 47 and fall into the reservoir 44.

Figure 7:
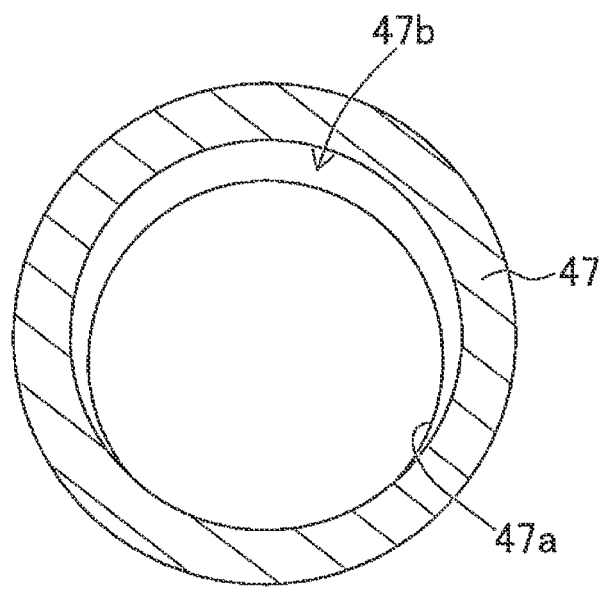
FIG. 7 is a sectional view taken along line VII-VII in FIG. 6.

At least an uppermost part of the inner peripheral surface 47a of the second connecting portion 47 in the circumferential direction is provided with a step 47b, such that at least the uppermost part of the inner peripheral surface 47a of the second connecting portion 47 is flush with the inner peripheral surface of the introduction pipe 42. This can suppress an increase in difference between an inner surface area of the second connecting portion 47 and an inner surface area of the introduction pipe 42, and thus can suppress increase in pressure loss. In the present embodiment, the step 47b is formed so as to gradually increase in radial length from a lower part toward an upper part of the inner peripheral surface 47a of the second connecting portion 47, as shown in FIG. 7. Further, the step 47b is provided so as to extend upward from a position separated from the lowermost part of the inner peripheral surface 47a by a predetermined distance (a predetermined angle around a center of the second connecting portion 47). That is, the step 47b is provided only in a portion of the inner peripheral surface 47a, which is upward of a region where water droplets flow.

In the present embodiment, as described above, the tip end of the first connecting portion 46 is disposed at a height equal to or lower than a height of the extension plane S1 extending along the lower part of the inner wall surface 55a, and the tip end of the first connecting portion 46 has the inclined surface 46b that is provided so as to be continuous with the inner peripheral surface 46a of the first connecting portion 46 and inclined downward toward the inner peripheral surface 46a. This makes the flow of the fuel off-gas around the tip end of the first connecting portion 46 smooth. That is, it is possible to suppress stagnation of the fuel off-gas around the opening 51 of the fuel gas pump 50. Thus, the water in the fuel gas pump 50 can be efficiently delivered to the fuel cell stack 10 together with the fuel off-gas, so that it is possible to suppress the water from remaining in the fuel gas pump 50.

In addition, the tip end of the first connecting portion 46 is provided with the inclined surface 46b that is continuous with the inner peripheral surface 46a of the first connecting portion 46 and inclined downward toward the inner peripheral surface 46a. This facilitates water droplets attached to the tip end (inclined surface 46b) of the first connecting portion 46 to return to the gas-liquid separator 40. That is, it is possible to suppress accumulation of water droplets in the opening 51 of the fuel gas pump 50. Accordingly, it is possible to restrain the water droplets accumulated in the opening 51 of the fuel gas pump 50 from freezing to block the opening 51. Also, it is possible to restrain the water droplets accumulated in the opening 51 of the fuel gas pump 50 from falling into the gas-liquid separator 40 due to vibration or the like after the vehicle stops and freezing to block the discharge path 43 of the gas-liquid separator 40.

Further, as described above, the inclined surface 46b is disposed on the extension plane S1 extending along the lower part of the inner wall surface 55a. Thereby, the flow of the fuel off-gas around the lower part of the inner wall surface 55a and the inclined surface 46b can be made particularly smooth. That is, it is possible to suppress, in particular, stagnation of the fuel off-gas around the opening 51 of the fuel gas pump 50. Thus, the water in the fuel gas pump 50 can be efficiently delivered to the fuel cell stack 10 together with the fuel off-gas, so that it is possible to suppress the water from remaining in the fuel gas pump 50, in particular.

Further, at least the lowermost part of the inner peripheral surface 47a of the second connecting portion 47 in the circumferential direction is formed so as to extend in a uniform manner downward toward the downstream side, in a region further downstream from the downstream end 42b of the introduction pipe 42. Thus, water droplets attached to the lowermost part of the inner peripheral surface 47a of the second connecting portion 47 in the circumferential direction move toward the downstream side of the second connecting portion 47 and fall into the reservoir 44. That is, unlike the case where, for example, a step projecting upward toward the downstream side is formed in the lowermost part of the inner peripheral surface 47a of the second connecting portion 47 in the circumferential direction, it is possible to suppress accumulation of water droplets in the second connecting portion 47 of the gas-liquid separator 40. Accordingly, it is possible to restrain the water droplets accumulated in the second connecting portion 47 of the gas-liquid separator 40 from freezing to block the second connecting portion 47. Also, it is possible to restrain the water droplets accumulated in the second connecting portion 47 from falling into the gas-liquid separator 40 due to vibration or the like after the vehicle stops and freezing to block the discharge path 43 of the gas-liquid separator 40.

It should be understood that the embodiments described herein are illustrative and not restrictive in all aspects. The scope of the disclosure is defined by the claims rather than the embodiments described above. Furthermore, the disclosure includes any and all modifications within the meaning and range equivalent to the scope of the claims.

For example, in the above-described embodiment, the example is shown in which the step 47b is not formed at least in the lowermost part of the inner peripheral surface 47a of the second connecting portion 47 in the circumferential direction. However, the disclosure is not limited to this, and the step may be formed along the entire circumference of the inner peripheral surface 47a.

Further, in the above embodiment, the example has been described in which the step 47b is formed on the inner peripheral surface 47a of the second connecting portion 47 of the gas-liquid separator 40. However, the disclosure is not limited to this. The step 47b need not be formed on the inner peripheral surface 47a of the second connecting portion 47.

Figure 8:
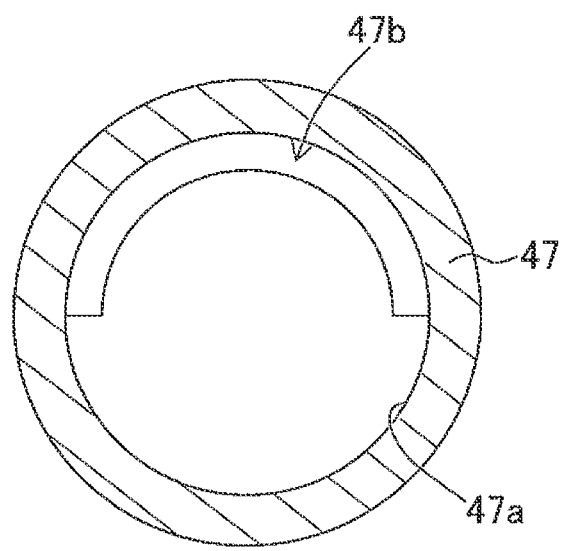
FIG. 8 is a diagram showing a step provided in a second connecting portion of the gas-liquid separator of the fuel cell system according to a first modification of the disclosure.

In addition, for example, as the gas-liquid separator 40 of the fuel cell system according to a first modification of the disclosure shown in FIG. 8, the step 47b may be provided on an upper half of the inner peripheral surface 47a of the second connecting portion 47 and need not be provided on a lower half of the inner peripheral surface 47a. In this case, the radial length of the step 47b may be constant.

Further, in the above embodiment, the example is shown in which the tip end of the first connecting portion 46 is provided with the tapered surface 46c. However, the tip end of the first connecting portion 46 need not be provided with the tapered surface 46c.

Figure 9:
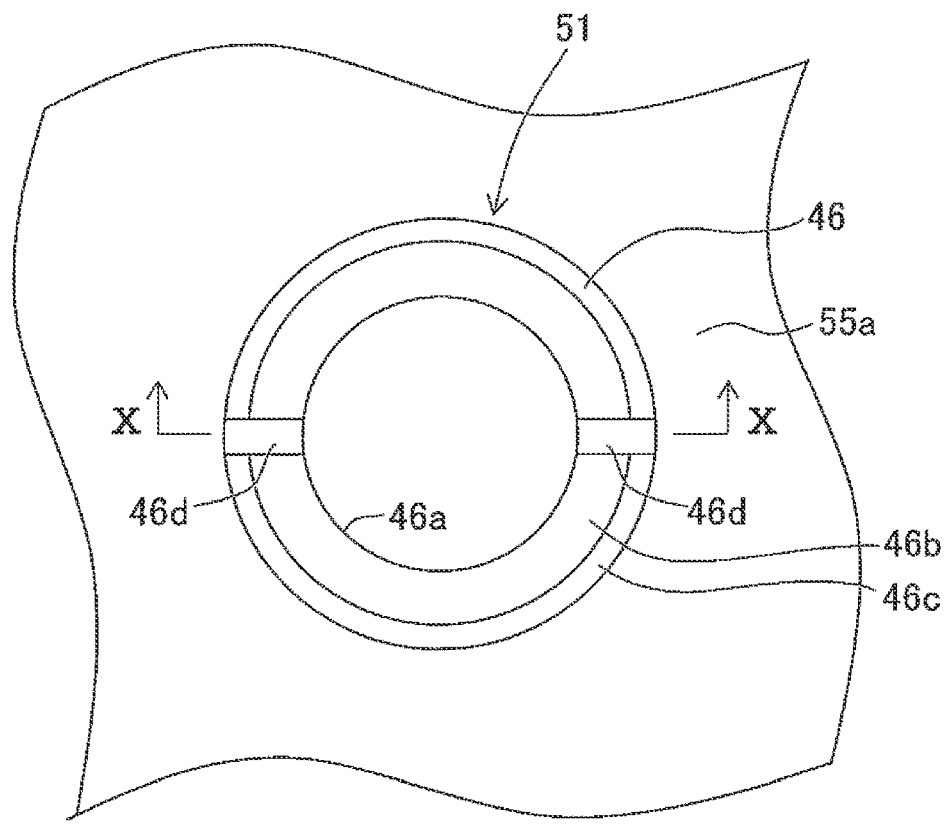
FIG. 9 is a plan view showing a structure around the first connecting portion of the gas-liquid separator of the fuel cell system according to a second modification of the disclosure.
Figure 10:
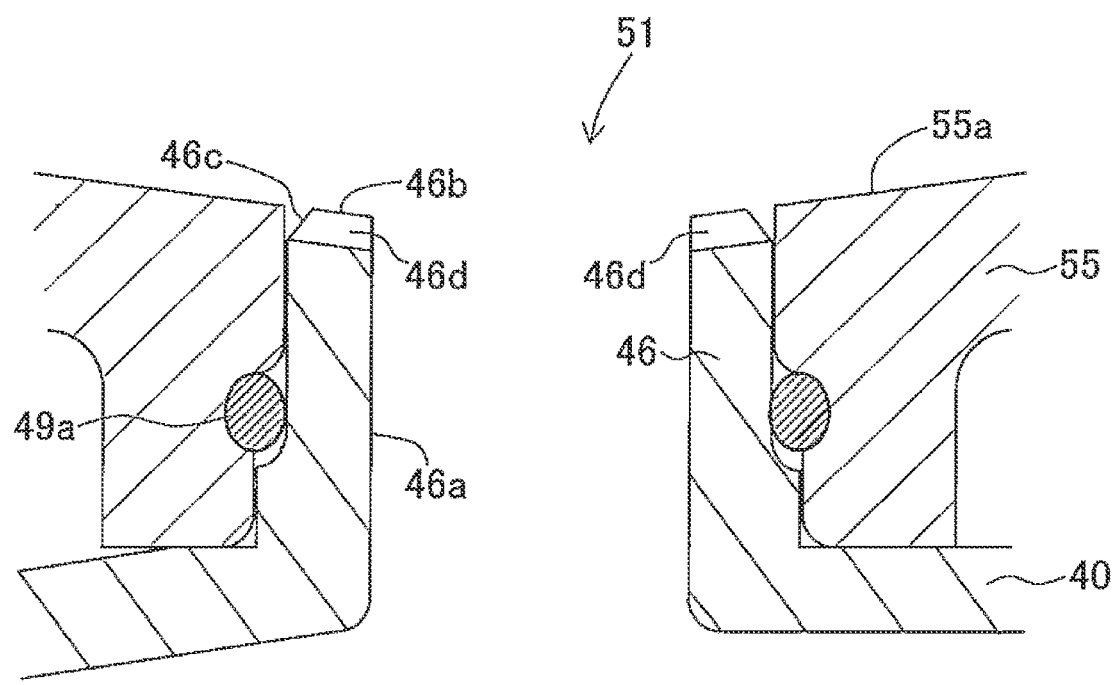
FIG. 10 is a sectional view taken along line X-X in FIG. 9.

Further, for example, as the gas-liquid separator 40 of the fuel cell system according to a second modification of the disclosure shown in FIGS. 9 and 10, the tip end of the first connecting portion 46 may be provided with cutouts 46d that are inclined downward as they extend toward the inner peripheral surface 46a. With this configuration, the water accumulated between the tapered surface 46c and the case 55 can flow down to the gas-liquid separator 40 through the cutouts 46d.

Further, in the above-described embodiment, the example is shown in which at least the lowermost part of the second connecting portion 47 of the gas-liquid separator 40 in the circumferential direction is formed in a linear shape without steps. However, the disclosure is not limited to this. On the downstream side of the downstream end 42b of the introduction pipe 42, a step recessing downward toward the downstream side may be provided at least in the lowermost part of the second connecting portion 47 in the circumferential direction.

What is claimed is:

1. A fuel cell system comprising:
  a gas-liquid separator configured to separate, from fuel off-gas, liquid contained in the fuel off-gas discharged from a fuel cell stack and store and discharge the separated liquid; and
  a fuel gas pump connected to the gas-liquid separator and configured to return the fuel off-gas in the gas-liquid separator to the fuel cell stack;
  wherein the gas-liquid separator has a first connecting portion having a tubular shape and extending upward;
  the fuel gas pump has an inner wall surface constituting a pump chamber, and a lower part of the inner wall surface is provided with an opening that is configured such that the first connecting portion is inserted into the opening;
  the lower part of the inner wall surface is inclined downward toward the opening;
  a tip end of the first connecting portion is disposed at a height equal to or lower than a height of an extension plane extending along the lower part of the inner wall surface; and
  the tip end of the first connecting portion is provided with an inclined surface that is continuous with an inner peripheral surface of the first connecting portion and is inclined downward toward the inner peripheral surface.

2. The fuel cell system according to claim 1, wherein the inclined surface of the first connecting portion is disposed on the extension plane.

3. The fuel cell system according to claim 1, further comprising:
  an introduction pipe configured to introduce the fuel off-gas discharged from the fuel cell stack into the gas-liquid separator,
  wherein the gas-liquid separator has a second connecting portion having a tubular shape and configured such that the introduction pipe is inserted into the second connecting portion and connected to the second connecting portion; and
  at least a lowermost part of an inner peripheral surface of the second connecting portion in a circumferential direction is provided so as to extend in a uniform manner downward toward a downstream side, in a region further downstream from a downstream end of the introduction pipe.

* * * * *